Oct. 15, 1940.   J. I. WLOCHALL   2,218,014
VEHICLE SIGNAL
Filed May 13, 1939
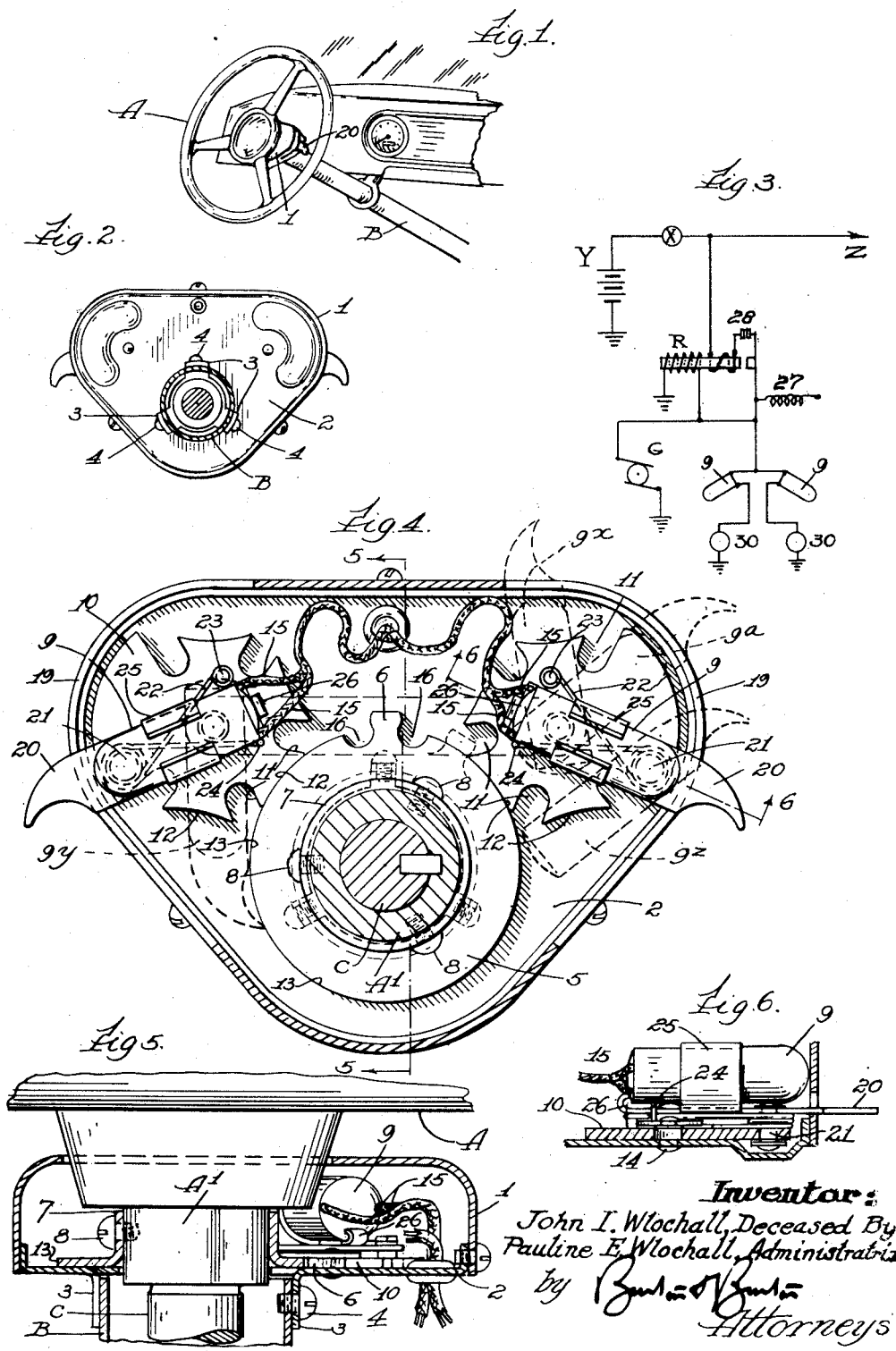

Patented Oct. 15, 1940

2,218,014

UNITED STATES PATENT OFFICE 2,218,014

VEHICLE SIGNAL

John I. Wlochall, deceased, late of Chicago, Ill., by Pauline E. Wlochall, administratrix, Chicago, Ill., assignor to Pauline E. Wlochall Application May 13, 1939, Serial No. 273,464

7 Claims. (Cl. 200—59)

This invention relates to vehicle signals, particularly of the type carried on the vehicle and operable by the driver or by the control mechanism of the vehicle for advising other drivers when the vehicle is about to change its speed or course of travel. One object of the invention is to provide a mechanism adapted for controlling electrically energized signals, and including switch mechanism in which the contact device is completely enclosed to ensure its absolute safety and reliability. Another object is to provide a mechanism adapted to employ a switch of the mercury tube type, and to be mounted for convenient manual operation adjacent the steering wheel of a vehicle. A further object is to provide a control mechanism for a direction or turn signal adapted to be manually adjusted for displaying the signal, and to be returned automatically to cut off the signal when the vehicle resumes a straight course. It is also an object of the invention to provide a signal control mechanism which may be operated manually and independently of movements of the vehicle, and also to connect the signal circuit into the electrical system of the vehicle without liability or danger of short-circuiting or draining said system. The invention consists in certain features and elements of construction in combination, as herein shown and described and as indicated by the claims.

In the drawing:

Fig. 1 is a perspective view showing the steering wheel of a motor vehicle with a signal control switch embodying this invention installed adjacent thereto.

Fig. 2 is a bottom view of the switch casing showing the steering mechanism itself in section.

Fig. 3 is a wiring diagram showing the signal circuit connected for operation by the usual generator on the vehicle.

Fig. 4 is a plan view on a larger scale than Fig. 2, showing the internal mechanism of the switch device with parts of the casing removed and parts shown in section.

Fig. 5 is a vertical section, taken as indicated at line 5—5 on Fig. 4, including a fragment of a steering wheel and its hub.

Fig. 6 is a detail section taken as indicated at line 6—6 on Fig. 4.

It may be understood that the switch mechanism herein illustrated is particularly designed for controlling signal mechanism carried on a vehicle, such as an automobile or motor truck, and usually including signal lights mounted at one or both ends of the vehicle for display at will to indicate when the vehicle is about to make a right or left turn, so that drivers of other vehicles may be properly warned in time to avoid collisions or other accidents. The controlling mechanism for such a signal system is conveniently located within reach of the driver's hands which are normally upon the steering wheel, indicated at A in Fig. 1, and, preferably, the operating devices should be designed so that they can be manipulated to some extent without removal of the driver's hand from the wheel A. For this purpose the present invention locates the switch mechanism immediately below the steering wheel A and in a casing 1, which extends substantially in a plane parallel to that of the steering wheel. The bottom wall 2 of the casing 1 is formed with a plurality of depending lugs 3, which may be secured by screws or bolts 4 to the fixed tubular casing or column B, which constitutes the steering post. Within the hollow post B, the steering shaft C is suitably journaled for rotation, and has affixed to its upper end the hub $A^1$ of the steering wheel A. A gear 5, having a single tooth 6, is formed with a central collar 7, which may be secured to the hub $A^1$ of the steering wheel by screws 8. Thus the gear 5 turns in the casing 1 whenever the steering wheel A is turned.

Within the casing 1 there are shown two mercury tube switches 9, 9, which may be understood as governing the two circuits needed for operating respectively the right and left turn indicators, whether they be in the nature of signal lights or electrically movable signal devices. Each of these switches is carried on a pinion 10, formed to cooperate with the single tooth 6 of the gear 5, and constituting therewith a combination of the character of stop gearing. As specifically shown, each pinion 10, includes notches 11, formed to inter-member with the tooth 6 of the gear 5, and each pinion has intermediate concave portions 12 which fit closely against the circular periphery 13 of the gear 5, so as to hold the pinion against rotation whenever the surfaces 12 and 13 are in contact, but permitting the pinion 10 to be turned upon its journal stud 14 through a limited arc as the tooth 6 passes into and out of engagement with one of the notches 11. At each side of the tooth 6, the gear 5 is formed with clearance notches 16, to facilitate the meshing of the tooth 6 with the notches 11. Each pinion 10 carries one of the mercury tube switches 9 for rotation with it.

It may be understood that the mercury tube switches 9 are of the type in which two terminals of an electric circuit are exposed in spaced relation within one end of a sealed tube, so that a quantity of mercury in the tube will serve to bridge the gap between the electrodes when the tube is positioned with that end downward. When the tube is tilted so that the end containing the electrodes is elevated, the mercury will flow away from that end and open the circuit. In some switches of this type the tube itself, being of metal, serves as one electrode, and may be externally covered by a sheath of insulating material. In the present device the mercury tube switches 9, which may be of this latter construction, are each secured for rotation with one of the pinions 10, and these pinions are mounted to turn in a plane parallel to the bottom wall 2 of the casing 1. Since the casing 1 is disposed substantially parallel to the plane of the steering wheel A, which is inclined, it will be seen that any turning movement of the pinions 10, caused by rotation of the steering wheel through the medium of the gear 5, will occur in an inclined plane. The normal and initial position of each of the mercury tube switches 9, as shown in full lines in Fig. 4, is such that, in view of the inclined positioning of the casing 1 and pinions 10, the end of each tube containing the spaced electrodes is uppermost. This is the end at which the lead wires 15, 15 are seen entering the tube.

When the steering wheel A is turned through small angles, as may be necessary in guiding the vehicle along the highway or through traffic, there will be no change in the positions of the pinions 10 or mercury tubes 9, because the tooth 6 of the gear 5 must swing through a considerable angle before it engages in the notch 11 of either pinion 10. However, when the vehicle is definitely turned through a larger angle by operation of the steering mechanism, the steering wheel will carry the gear 5 into mesh with one of the pinions 10 and will turn the pinion through a limited angle, but far enough to swing its tube 9 sufficiently to reverse its inclination, as indicated at 9ª in Fig. 4, so that the end containing the electrodes will be tilted downwardly, and the mercury within the tube will flow toward that end and complete the connection between lead wires 15, 15, thus closing the circuit of the signal device, such as a lamp 30, shown in Fig. 3.

If, in making the turn, the steering wheel A and the connected gear 5 should be rotated through more than a complete revolution, the tooth 6 will then engage a second notch 11 in the pinion 10 and will turn the pinion through a further angle, but in the same direction, and without reversing the inclination of the mercury tube 9. And, in turning through a full revolution, the gear 5 will also intermesh with one of the notches 11 of the other pinion 10; but the rotation of said other pinion thus produced will not be in a direction to reverse the inclination of its switch tube 9, but will merely carry the upper end slightly higher and thus maintain the circuit which it controls in open condition. Fig. 4 shows in dotted outline at 9ˣ the position which the right-hand tube 9 will assume if the steering wheel is turned through more than a full revolution and indicates at 9ʸ in dotted outline the position which the left-hand tube will assume under the same conditions.

Frequently, and particularly in crowded traffic, it is desirable for the driver to signal to those following him that he is about to make a turn, and such signal should be given some time before the steering wheel A is actually shifted from its straight-ahead position. To permit such operation the switch tubes 9 are mounted on their respective pinions 10 by means of levers 20, and these levers are pivotally secured to the pinions by studs 21. A wire spring 22 is associated with each of the levers 20 and has one end anchored to a post 23 on the pinion. The spring is coiled about the pivot stud 21 and has its opposite end upturned at 24 to engage against the edge of the lever 20. The lever 20 is normally stopped against the post 23, at which position it is yieldingly held by the spring 22 but, when desired, the projecting finger-piece of the lever 20 may be actuated by the driver to swing the lever about the pivot stud 21, in opposition to the spring 22, so as to incline the switch tube 9 as indicated in dotted outline at 9ᶻ, for thus manually closing the circuit of the turn signal corresponding to the direction in which the next turn is to be made. Independently of the position at which the switch tube and its lever 20 are held manually by the driver, the gear 5 will pick up the pinion 10 and turn it when the steering wheel is rotated in actually making the turn. Thus, after the driver has operated the signal manually, he may release it, knowing that it will be maintained while the turn is being made; or if he has held the switch manually in signaling position while making the turn he can rely upon the gears 5 and 10 to return the signal to normal open-circuit position when the turn is completed.

The mercury switch tubes 9 are ordinarily furnished by the manufacturer with wires already attached to the electrodes inside the tubes and emerging therefrom for connection with suitable lead wires. Thus it is unnecessary to have any binding posts or other detachable circuit terminals within the case 1 of the switch mechanism, and since the wires 15 are fully covered throughout their length, there are no exposed electrical contacts in the device. The tubes 9 are, of course, sealed so that any arcing which occurs upon making or breaking of the signal contacts is fully protected, and even with an accumulation of live gas in the driver's compartment there is no possibility of fire or explosion being caused by any part of the switch mechanism embodying this invention. The tubes 9 are supported on their respective levers 20 by spring clip arms 25, engaging the tubes laterally, and they are positioned longitudinally by lugs 26, against which the tubes are stopped at one end. Although the side wall of the casing is slotted at 19 to permit swinging movement of the finger-pieces of the levers 20, the slots are relatively narrow, and the side walls serve to prevent longitudinal displacement of the tubes 9 on their levers 20.

The wiring diagram of Fig. 3 is provided to show a desirable method of connecting the signal circuit into the regular wiring system of the motor vehicle. G represents the generator which furnishes electric current when the vehicle is running, and Y represents the battery which supplements the generator. Usually, from the battery the circuit leads through an ammeter indicated at X, and thence to the regular lighting circuit and other electrical devices, as indicated by the arrow at Z. For protecting the battery against grounding through the generator when the latter stands idle, a relay is usually provided at R. The core of the relay is wound with several turns connected to the generator so that when the generator is operating the magnetic attraction of the core overcomes a spring 27 and closes contacts at 28, thus coupling the generator into the same line with the battery Y for supplying current at Z. The battery connection includes a limited number of turns of low resistance. For certain purposes this may serve to open the contacts at 28, as when the generator stands idle. If the vehicle should be stopped with the steering wheel turned far enough to swing either of the switches 9 to closed circuit position, the battery current through one of the signal lamps 30 would not be sufficient to provide adequate magnetic effect at the relay to hold the contacts closed at 28 against the force of spring 27. Thus, as soon as the vehicle engine is stopped and the generator ceases to energize the relay R, the contacts 28 will open, and there will be no drain on the battery, even to the extent of lighting either of the turn signal lamps 30. Thus the relay serves to automatically protect the battery against this possible drain.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

What is claimed is:

1. In a motor vehicle having a steering wheel disposed in an inclined plane, a signal circuit including a mercury tube switch and a gear member upon which it is mounted in inclined position for rotation in a plane substantially parallel to that of the steering wheel, with a cooperating gear connecting said gear member with the steering wheel for rotation thereby, so that the mercury switch is rotatively shifted from circuit-opening to circuit-closing position when the steering wheel is turned, said switch being pivotally mounted on the support, and manually rotatable upon its pivot to circuit-closing position independently of the gearing.

2. In a motor vehicle having a steering wheel disposed in an inclined plane, a signal circuit including a mercury tube switch and a gear member upon which it is mounted in inclined position for rotation in a plane substantially parallel to that of the steering wheel, with a cooperating gear connecting said gear member with the steering wheel for rotation thereby, so that the mercury switch is rotatively shifted from circuit-opening to circuit-closing position when the steering wheel is turned, said switch being pivotally mounted on the support, and manually rotatable upon its pivot to circuit-closing position independently of the gearing, with spring means reacting between said gear member and the switch to return it to its normal position on the gear member when manually released.

3. In a motor vehicle having a steering wheel disposed in an inclined plane, a signal circuit including a mercury tube switch and a support upon which it is mounted in inclined position for rotation in a plane substantially parallel to that of the steering wheel, with means for transmitting rotation from the steering wheel to the support for shifting the mercury switch from circuit-opening to circuit-closing position when the steering wheel is turned, said switch being movably mounted on the support, and manually controlled means operable independently of the steering wheel movement for moving said switch to circuit-closing position at will.

4. In the combination defined in claim 3, said manually controlled means being located immediately below the plane of the steering wheel and conveniently accessible without removing the hand from the steering wheel.

5. In a motor vehicle having a steering wheel disposed in an inclined plane, a signal circuit including a switch which comprises a tube or guideway with a pair of circuit terminals disposed in spaced relation at one end of the tube, and a circuit-closing element movable into and out of contact with said terminals under the influence of gravity, a support by which the tube is carried for rotation in inclined position in a plane substantially parallel to that of the steering wheel, and means for transmitting motion from the steering wheel to the support for shifting said element in the tube or guideway when the steering wheel is turned, said switch being movably mounted on the support, and manually controlled means operable independently of the steering wheel movement for moving said switch to circuit-closing position at will.

6. In a motor vehicle having a steering wheel disposed in an inclined plane, a signal circuit including a mercury tube switch pivotally mounted for rotation in a plane substantially parallel to that of the steering wheel, and manually operable means for rotating said switch upon its pivotal mounting at will and independently of the movement of the steering wheel.

7. In a motor vehicle having a steering wheel disposed in an inclined plane, a signal circuit including a switch which comprises a tube or guideway with a pair of circuit terminals disposed in spaced relation at one end of the tube and a circuit-closing element movable into and out of contact with said terminals under the influence of gravity, a support by which the tube is pivotally carried for rotation in inclined position in a plane substantially parallel to that of the steering wheel and manually operable means located adjacent the plane of the steering wheel and conveniently accessible without removing the hand from said wheel for rotating said switch about its pivot to circuit-closing position at will and independently of the movement of the steering wheel.

PAULINE E. WLOCHALL,
*Administratrix of the Estate of John I. Wlochall,
Deceased.*